(12) United States Patent
Yon

(10) Patent No.: US 7,204,432 B2
(45) Date of Patent: Apr. 17, 2007

(54) MULTI-PURPOSE WINDOW-WASHER SPRAYER WITH ORIENTABLE JET, IN PARTICULAR FOR VEHICLES

(75) Inventor: Fulvio Yon, Donnas (IT)

(73) Assignee: ITW Automotive Italia S.R.L., Turin (IT)

( * ) Notice: Subject to any disclaimer, the term of this patent is extended or adjusted under 35 U.S.C. 154(b) by 0 days.

(21) Appl. No.: 11/057,230

(22) Filed: Feb. 15, 2005

(65) Prior Publication Data

US 2005/0178852 A1  Aug. 18, 2005

(30) Foreign Application Priority Data

Feb. 17, 2004  (IT)  .......................... TO2004A0091

(51) Int. Cl.
  *B05B 1/10*   (2006.01)
  *B05B 1/00*   (2006.01)
  *B60S 1/46*   (2006.01)

(52) U.S. Cl. .............................. 239/284.2; 239/284.1; 239/597; 239/600

(58) Field of Classification Search ............. 239/284.2, 239/284.1, 597, 600, 580, 587.5
See application file for complete search history.

(56) References Cited

U.S. PATENT DOCUMENTS

| | | | |
|---|---|---|---|
| 2,898,036 A | | 8/1959 | Newill ........................ 239/110 |
| 6,354,515 B1 * | | 3/2002 | Matsumoto et al. ..... 239/284.1 |
| 6,508,414 B2 * | | 1/2003 | Matsumoto et al. ..... 239/284.1 |
| 6,626,377 B1 * | | 9/2003 | Vogt ......................... 239/284.1 |
| 6,789,747 B2 * | | 9/2004 | Kuch et al. .............. 239/284.1 |

FOREIGN PATENT DOCUMENTS

| | | |
|---|---|---|
| DE | 4425493 | 1/1995 |
| DE | 19742471 | 4/1999 |
| EP | 1216903 * | 6/2002 |
| FR | 1515616 | 3/1968 |
| FR | 2803542 | 7/2001 |
| GB | 2250218 | 6/1992 |
| WO | 02/060589 | 8/2002 |
| WO | 2005/021341 | 3/2005 |

OTHER PUBLICATIONS

European Search Report.

* cited by examiner

*Primary Examiner*—Kevin Shaver
*Assistant Examiner*—Darren Gorman
(74) *Attorney, Agent, or Firm*—Lowe Hauptman & Berner, LLP

(57) ABSTRACT

A window-washer sprayer is configured to provide an orientable jet by substitution of a cylindrical nipple installed within a seat of an enbloc sprayer body. The sprayer body defines the seat, an internal duct for passage of a detergent fluid, and a side window made in a position corresponding to the seat and partially occupied in use by the cylindrical nipple. The internal duct, the seat, and the nipple have a geometry such that when a flow of detergent fluid is fed into the internal duct it splits by fluid-dynamic effect into a number of separate flows that simultaneously reach the seat and are expelled through a through radial slit or a plurality of through radial holes selectively made in the cylindrical nipple in a position corresponding to the side window of the sprayer body.

7 Claims, 1 Drawing Sheet

MULTI-PURPOSE WINDOW-WASHER SPRAYER WITH ORIENTABLE JET, IN PARTICULAR FOR VEHICLES

RELATED APPLICATIONS

The present application is based on, and claims priority from, Italian Application Number TO2004A 000091, filed Feb. 17, 2004, the disclosure of which is hereby incorporated by reference herein in its entirety.

FIELD OF THE INVENTION

The present invention relates to a multi-purpose window-washer sprayer having an orientable jet, indicated for use on vehicles, for example for cleaning a windscreen and/or a rear window and/or a headlamp of a vehicle. In particular the invention relates to a window-washer sprayer designed to function selectively, in use, either as fluid-dynamic sprayer, or as filiform sprayer.

BACKGROUND OF THE INVENTION

It is known that in vehicles, in order to deliver a washing fluid into a position corresponding to a glass to be cleaned, for example the windscreen, the rear window, or else the closing glass or lens of a headlight of the vehicle, one or more windscreen-washer sprayers are used, which are installed in a fixed position on the bodywork of the vehicle. For example, for cleaning the windscreen there are usually provided two symmetrical sprayers installed on a portion of bonnet or of bodywork immediately adjacent to the base of the windscreen.

On account of the relatively wide tolerances for machining the sheet metal forming the bodywork, however, it may happen that the jet of detergent fluid produced in use by the sprayers and directed towards the window to be cleaned will be emitted with an incorrect orientation and will not strike (or will strike in an ineffective way) the window itself. To overcome said drawback there is known a sprayer comprising a sprayer body that can be fixed to the bodywork of the vehicle in a fixed position and a cylindrical or spherical nipple carried idle by the sprayer body and provided with one or more holes. The detergent fluid is emitted in the form of filiform jets through the holes of the nipple, and the jets can be oriented as desired by rotating the nipple with respect to the sprayer body so as to compensate for the possible errors of orientation linked to the fixed position of assembly of the sprayer body.

However, said solution is not normally applicable to the case of sprayers of a fluid-dynamic type, in which the detergent fluid is not emitted in the form of filiform jets, through holes, but in the form of an atomized jet, through an elongated slit, thanks to a particular internal conformation of the sprayer body. Consequently, the sprayers of a fluid-dynamic type, which are currently the type preferred by users, do not usually have the possibility of adjusting the orientation of the jet.

There is known on the market a sprayer of a fluid-dynamic type having an orientable jet, but it is of complex and costly construction since it comprises numerous parts. In addition, it has a structure such as not to have any components in common with sprayers of other types, in particular filiform-jet ones; consequently, it is not possible to obtain economies of scale.

SUMMARY OF THE INVENTION

It is therefore a purpose of the present invention to overcome the drawbacks described above by means of a window-washer sprayer for vehicles that presents a simple and far from costly construction and reduced overall dimensions, which can be obtained with the smallest number of component elements possible, in particular not more than two, and that will enable both atomized and filiform jets to be obtained selectively, in a simple way, for example by substitution of a single component element so as to enable orientable sprayers of both a fluid-dynamic and a filiform type to be obtained with a few standardized component elements, with consequent possible marked economies of scale.

According to some aspects of the invention there is thus provided a window-washer sprayer.

In particular, the window-washer sprayer of the present invention comprises a sprayer body designed to be installed in a fixed position with respect to the window to be cleaned, and a cylindrical nipple installed laterally, idle and fluid-tight, within a transverse seat defined by said sprayer body. The latter moreover defines an internal duct, for the passage of said detergent fluid, and a side window made in a position corresponding to said seat and partially occupied in use by said cylindrical nipple. According to the invention, the internal duct, the seat and the nipple have a geometry such that, when a flow of detergent fluid is fed into the internal duct it splits by fluid-dynamic effect into a plurality of separate flows, which simultaneously reach said seat and are expelled through at least one through radial opening made through the cylindrical nipple in a position corresponding to the side window of the sprayer body.

In particular, the internal duct is rectilinear and comprises a blind terminal portion delimited by a cylindrical side wall and by a plane bottom end wall, where said blind terminal portion has a rectilinear axis, coaxial with that of the internal duct and substantially having the same internal diameter. The transverse seat for the nipple and the side window of the sprayer body are made in a position such that an end facing the inside of the sprayer body of the through radial opening of the nipple is in use always positioned at a pre-set and relatively small distance from said plane bottom end wall of the blind terminal portion of the internal duct; specifically, said relatively small distance is comparable in dimensions with those of the width of the cross section of passage of the through radial opening of the nipple measured in the direction of the axis of symmetry of the internal duct.

Is has been surprisingly verified experimentally that a window-washer sprayer made with such a geometry can function, without any modification to the sprayer body, either as filiform sprayer or as fluid-dynamic sprayer, by simply providing the radial opening of the nipple either in the form of a prismatic slit or in the form of one or more circular holes.

According to a primary characteristic of the invention, therefore, the seat of the sprayer body is made for receiving selectively either a cylindrical nipple of a first pre-set type, in which the through radial opening is constituted by a single slit made longitudinally in the nipple, or a cylindrical nipple of a second pre-set type, in which the radial opening is defined by a plurality of through radial holes arranged longitudinally in series parallel to a generatrix of the nipple itself.

In this way, one and the same sprayer body, when it is provided with a nipple of the first pre-set type, defines an orientable fluid-dynamic sprayer, and when it is provided with a nipple of the second pre-set type, defines an orientable filiform sprayer, with consequent possible considerable economies of scale in the production stage.

Furthermore, it is possible for the first time to provide the user with a fluid-dynamic sprayer with orientable jet made up of just two pieces (nipple and sprayer body) and hence having a low cost and contained overall dimensions, in addition to considerable ease of assembly and maintenance.

BRIEF DESCRIPTION OF THE DRAWINGS

Further characteristics and advantages of the invention will appear clearly from the ensuing description of a non-limiting example of embodiment thereof, made with reference to the figures of the annexed drawings, in which.

DETAILED DESCRIPTION OF THE INVENTION

With reference to FIGS. 1 to 4, designated as a whole by 1 is a window-washer sprayer, in particular suitable for installation on vehicles, designed to generate in use at least one orientable jet of a detergent fluid in the direction of a window to be cleaned, of a known type and not illustrated herein for reasons of simplicity.

Figure 1:
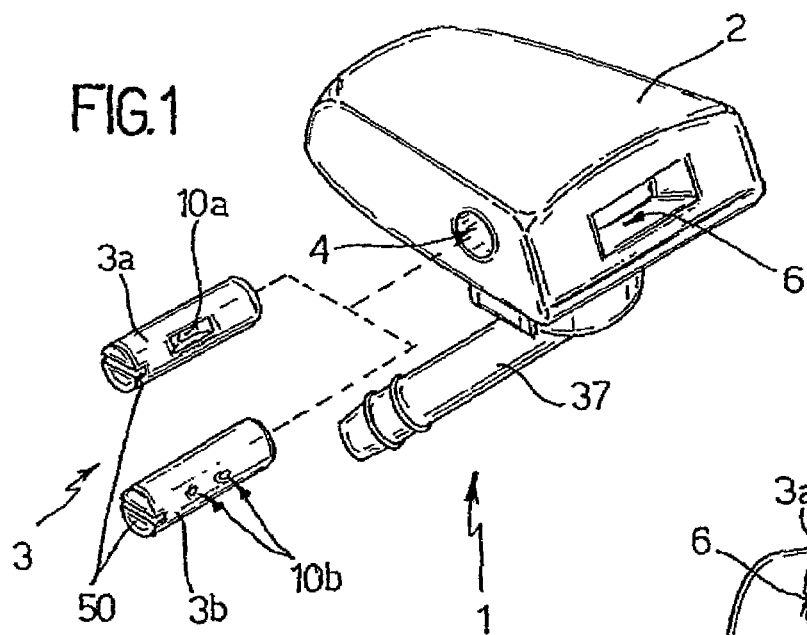
FIG. 1 illustrates an exploded perspective view of a window-washer sprayer made according to the invention, having two different components that can be selectively installed in one and the same sprayer body.
Figure 2:
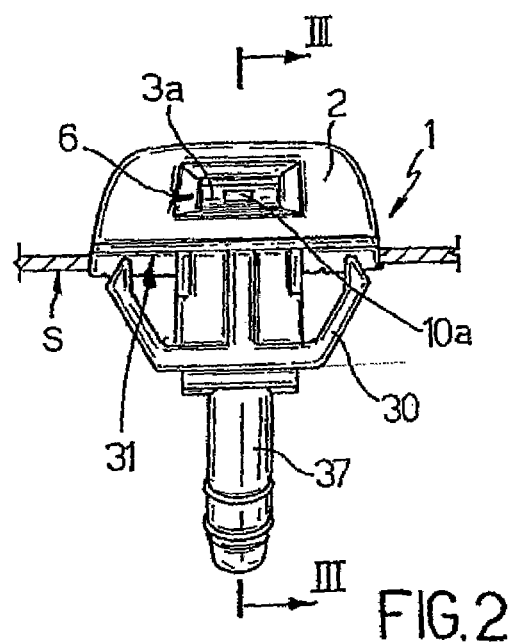
FIG. 2 illustrates a front elevation of the window-washer sprayer illustrated in FIG. 1 with just one component installed.
Figure 3:
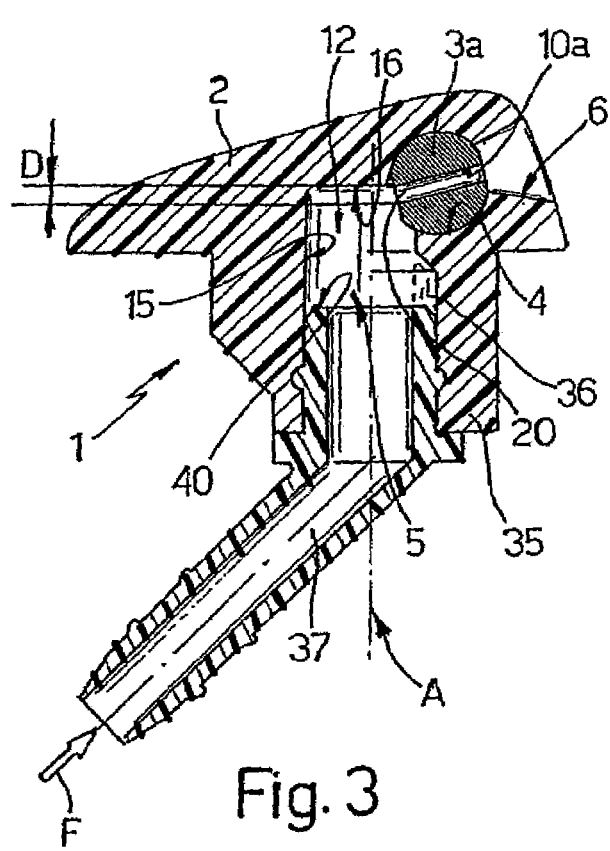
FIG. 3 illustrates a side elevation sectioned according to a plane of trace III—III of the sprayer illustrated in FIG. 2.
Figure 4:
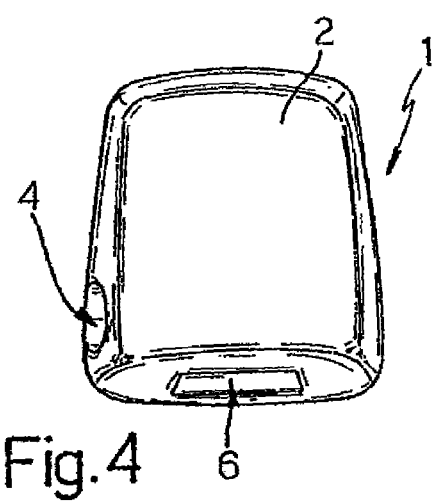
FIG. 4 illustrates a plan view from above of the sprayer illustrated in FIGS. 1 and 2.

The sprayer 1 comprises a sprayer body 2 designed to be installed, in a known way, in a fixed position with respect to the window to be cleaned, and a cylindrical nipple 3 installed laterally, idle and fluid-tight, within a transverse seat 4 defined by the sprayer body 2. The latter moreover defines an internal duct 5 for passage of the aforementioned detergent fluid, and a side window 6 made in a position corresponding to the seat 4 and partially occupied in use by the cylindrical nipple 3 (FIG. 3).

The internal duct 5, the seat 4, and the nipple 3 are, according to the invention, made with a geometry such that, when a flow F of detergent fluid (FIG. 3) is fed into the duct 5, it splits by fluid-dynamic effect into a plurality of separate flows, which simultaneously reach the seat 4 for being expelled simultaneously through at least one through radial opening 10 made through the nipple 3 in a position corresponding to the side window 6 of the sprayer body, basically according to what is described in the patent application No. EP 01130595.0 filed in the name of the present applicant.

In particular, the internal duct 5 is rectilinear and comprises a blind terminal portion 12 (FIG. 3) delimited by a cylindrical side wall 15 and by a plane bottom end wall 16. The blind terminal portion 12 has a rectilinear axis coaxial with that of the internal duct 5, designated in FIG. 3 by the letter A. The duct 5 and the portion 12 moreover substantially have the same internal diameter. In combination with said geometry, the transverse seat 4 for the nipple 3 and the side window 6 of the sprayer body 2 are made in a position such that one end 20 (FIG. 3) facing the inside of the sprayer body 2 of the through radial opening 10 of the nipple 3 is in use always positioned at a pre-set and relatively small distance D from the plane bottom end wall 16. In particular, by the term "relatively small" it must be understood that said distance D has dimensions comparable with those of the width of the section of passage of the through radial opening 10 of the nipple 3 measured in the direction of the axis of symmetry A, i.e., of the "height" of the opening 10.

According to the main aspect of the invention, the geometry described above is selected in combination with a seat 4 made so as to be designed to receive selectively and indifferently (FIG. 1) a cylindrical nipple 3a of a first pre-set type, in which the through radial opening 10 is constituted by a single slit 10a made longitudinally in the nipple 3a, and a cylindrical nipple 3b of a second pre-set type, provided with a plurality (two or three) of through radial holes 10b arranged longitudinally in series parallel to a generatrix of the nipple 3b.

In this way, according to the invention, one and the same sprayer body 2, when it is provided with a nipple 3a of the first pre-set type, defines an orientable fluid-dynamic sprayer and, when it is provided with a nipple 3b of the second pre-set type, defines an orientable filiform sprayer.

The sprayer body 2 and the nipple 3a or 3b, which can be selectively installed therein, are each constituted by a single moulded piece made of a synthetic plastic resin and may be coupled together, the second one in the first, in a fluid-tight and rotatable way, via snap-action means (which are known and not illustrated herein for reasons of simplicity).

The sprayer body 2 is moreover provided with means 30 for coupling to a support S (FIG. 2), in a fixed position with respect to the window to be cleaned (not illustrated herein). For example, the support S can be an element of the vehicle body, and the means 30 are constituted by tabs for snap-action engagement in a template 31 of the support S.

Underneath, the body 2 comprises a collar 35 provided internally with an axial seat 36 designed to receive by snap action, in an idle and fluid-tight (and substantially known) way, a hydraulic connector 37 for a tube (not illustrated herein) for delivery of the flow of detergent fluid F. The seat 36 is set substantially coaxial with the internal duct 5, and the hydraulic connector 37 has an internal diameter that is substantially the same as that of the internal duct 5, in such a way that, in use, the cylindrical side wall 15 of the blind terminal portion 12 of the internal duct 5 is set substantially flush with an internal outlet edge 40 of the connector 37, as is clearly illustrated by the dashed lines in FIG. 3.

In this way, any sharp variation of cross section in the elements that are traversed by the flow of fluid F is prevented, and this can therefore flow with laminar motion, without any turbulence, through the sprayer 1, reaching as far as the mouth 20 of the slit b0a or of the holes 10b, according to whether in the body 2 there is inserted a nipple 3a or a nipple 3b, which, apart from the different through radial opening 10, are absolutely identical to one another and, hence, interchangeable.

Consequently, if the holes 10b are present the flow of fluid F in laminar motion will flow out of the body 2, through the window 6, in the form of filiform jets separate from one another, which will then strike the window to be cleaned. If there is a single slit 10a present, the separate flows in laminar motion into which the flow F of detergent fluid has been fluid-dynamically separated thanks to the geometry described above will simultaneously reach the slit 10a, being expelled simultaneously through the window 6, in this way being forced to strike against one another and consequently generating out of the window 6 a single atomized and turbulent jet of detergent fluid.

In both cases it will be possible to orient the (atomized) jet or the (filiform) jets of detergent fluid that exits/exit from the opening 6 by simply causing the nipple 3a or 3b to rotate in the seat 4 through an appropriate angular arc. For this purpose, the nipple 3a or 3b is provided, on the outside of the body 2, with adjustment means 50 (see FIG. 1), for example constituted by a slot or recess for a screwdriver.

Obviously the window 6 is shaped, in the direction of the axis A, like a fan; i.e., it is delimited in elevation by flared edges (FIG. 3) so as to guarantee an absence of interference between the edges of the opening 6 and the jet or jets of detergent fluid that traverses/traverse it, whatever the orientation of nipple 3a or 3b.

The invention claimed is:

1. A window-washer sprayer, for generating at least one orientable jet of a detergent fluid towards a window to be cleaned, comprising:
    a sprayer body configured to be installed in a fixed position with respect to the window to be cleaned; and
    a cylindrical nipple installed laterally, idle and fluid-tight, within a transverse seat defined by said sprayer body;
    said sprayer body further defining an internal duct, for the passage of said detergent fluid, and a side window made in a position corresponding to said seat and partially occupied in use by said cylindrical nipple;
    wherein said internal duct is rectilinear and comprises a blind terminal portion delimited by a cylindrical side wall and by a plane bottom end wall;
    wherein said internal duct, said seat and said nipple are configured to expel a fluid through at least one radial opening made through said cylindrical nipple in a position corresponding to said side window of the sprayer body; and
    wherein said seat of said sprayer body is designed to receive selectively one said cylindrical nipple of a first pre-set type, in which said at least one through radial opening is constituted by a single slit made longitudinally in the nipple, and another said cylindrical nipple of a second pre-set type, provided with a plurality of through radial holes arranged longitudinally in series parallel to a generatrix of said nipple; in such a way that one and the same sprayer body, when it is provided with a nipple of the first pre-set type, defines an orientable fluid-dynamic sprayer and, when it is provided with a nipple of the second pre-set type, defines an orientable filiform sprayer.

2. The window-washer sprayer according to claim 1, wherein said sprayer body and said nipple are each constituted by a single moulded piece made of a synthetic plastic resin and may be coupled together.

3. The window-washer sprayer according to claim 2, wherein said sprayer body is provided with an element for coupling to a support in a fixed position with respect to said window to be cleaned.

4. The window-washer sprayer according to claim 3, further comprising, underneath, a collar provided internally with an axial seat designed to receive by snap action, in an idle and fluid-tight way, a hydraulic connector for a tube for delivery of a detergent fluid; said seat being set substantially coaxial with said internal duct.

5. The window-washer sprayer according to claim 4, wherein said blind terminal portion has a rectilinear axis coaxial with that of said internal duct and substantially the same internal diameter; said transverse seat for the nipple and said side window of the sprayer body being made in a position such that an end facing the inside of the sprayer body of said through radial opening of the nipple is in use always positioned at a pre-set and relatively small distance from said plane bottom end wall of said blind terminal portion of said internal duct.

6. The window-washer sprayer according to claim 5, wherein said pre-set and relatively small distance present in use between said end facing the inside of the sprayer body of said through radial opening of the nipple and said plane bottom end wall of said blind terminal portion of said internal duct is of dimensions comparable with those of the width of the section of passage of said through radial opening of the nipple measured in the direction of the axis of symmetry of said internal duct.

7. The window-washer sprayer according to claim 5, wherein said hydraulic connector for a tube for delivery of a detergent fluid has an internal diameter substantially identical to that of said internal duct, in such a way that, in use, said cylindrical side wall of said blind terminal portion of the internal duct will be set substantially flush with an internal outlet edge of said connector.

* * * * *